(12) United States Patent
Bronicki et al.

(10) Patent No.: US 6,571,548 B1
(45) Date of Patent: Jun. 3, 2003

(54) WASTE HEAT RECOVERY IN AN ORGANIC ENERGY CONVERTER USING AN INTERMEDIATE LIQUID CYCLE

(75) Inventors: Lucien Y. Bronicki, Yavne (IL); Nadav Amir, Rehovot (IL); Uri Kaplan, Soreg (IL); Danny Batscha, Ramat Hasharon (IL)

(73) Assignee: Ormat Industries Ltd., Yavne (IL)

( * ) Notice: Subject to any disclaimer, the term of this patent is extended or adjusted under 35 U.S.C. 154(b) by 0 days.

(21) Appl. No.: 09/224,279

(22) Filed: Dec. 31, 1998

(51) Int. Cl.$^7$ ................................................. F02C 3/28
(52) U.S. Cl. ................................... 60/39.02; 60/39.181
(58) Field of Search ............................... 60/39.02, 39.04, 60/39.181, 39.182

(56) References Cited

U.S. PATENT DOCUMENTS

| | | | |
|---|---|---|---|
| 2,548,508 A | | 4/1951 | Wolfner |
| 3,436,912 A | * | 4/1969 | Squires .................... 60/39.181 |
| 3,974,642 A | * | 8/1976 | Pacault .................... 60/39.182 |
| 4,184,325 A | * | 1/1980 | Mandrin ................... 60/39.181 |
| 4,272,953 A | * | 6/1981 | Rice ........................ 60/39.182 |
| 4,353,204 A | * | 10/1982 | Arakawa ................... 60/39.02 |
| 5,632,143 A | * | 5/1997 | Fisher et al. ............. 60/39.181 |
| 5,640,842 A | * | 6/1997 | Bronicki et al. .......... 60/39.182 |
| 5,687,570 A | | 11/1997 | Bronicki et al. |
| 5,713,195 A | * | 2/1998 | Bronicki et al. .......... 60/39.182 |
| 5,799,490 A | | 9/1998 | Bronicki et al. |

FOREIGN PATENT DOCUMENTS

| | | |
|---|---|---|
| DE | 196 30 058 | 1/1998 |
| EP | 0 659 981 | 6/1995 |

* cited by examiner

*Primary Examiner*—Charles G. Freay
(74) *Attorney, Agent, or Firm*—Nath & Associates PLLC; Gary M. Nath; Jerald L. Meyer

(57) ABSTRACT

A heat recovery method and system that extracts heat from the exhaust of a gas turbine unit in a waste heat, heat exchanger and transfers the heat to an intermediate fluid, which can be pressurized water. The intermediate fluid in-turn transfers the heat to an organic working fluid resulting in the vaporization thereof. The vaporized organic working fluid drives a series of turbines which in turn drive a generator that generates electricity.

35 Claims, 1 Drawing Sheet

WASTE HEAT RECOVERY IN AN ORGANIC ENERGY CONVERTER USING AN INTERMEDIATE LIQUID CYCLE

TECHNICAL FIELD

This invention relates to a waste heat recovery system and to a method of using the same. In particular it relates to a waste heat recovery system for a gas turbine system and to a method for using a heat recovery cycle with the exhaust gases produced by a gas turbine system.

BACKGROUND OF THE INVENTION

Throughout the world, gas turbines burning a combustable fuel are used to generate power. This power can be used for example to drive fluid pumps, to operate gas compressors, to operate other equipment and to generate electricity. Often these turbines are located in remote places around the globe where there are extreme weather conditions including freezing temperatures. When operating, the gas turbines produce exhaust gases that are usually extremely hot, and just as often, these hot gases are merely exhausted into the atmosphere instead of being utilized to generate additional power.

For example, high pressure natural gas transmission pipelines are conventionally used for transporting gas from production fields to customers remotely located from the fields. Gas compressors feeding such pipelines usually are powered by a gas turbine, and optionally, a heat recovery cycle can be employed to reduce the net power requirements by converting waste heat in the hot exhaust gases from the turbine into electricity. An installation of this type is illustrated in the U.S. Fisher et al. U.S. Pat. No. 5,632,143 issued May 27, 1997 which is incorporated herein by reference. In summary, this patent discloses a combined cycle power plant having a gas turbine system. In one embodiment a bottoming steam turbine power plant utilizes heat contained in the exhaust gases exiting the gas turbine system while in another embodiment a bottoming organic Rankine cycle power plant utilizes heat contained in the exhaust gases of the gas turbine system. Typically, the temperature of the exhaust gases is about 450° C. In accordance with this patent the temperature of the gases from which heat is transferred to the bottoming power plant is controlled using ambient air added to the exhaust gases of the gas turbine system. During cold weather, ambient temperatures may drop below freezing causing the steam condensate to freeze thus adversely affecting the operation of the heat recovery system.

On the other hand, organic fluids operating as the working fluid in such systems having relatively high temperatures may not be stable.

There is therefore a need for an improved heat recovery cycle for a gas turbine system which can be utilized in extreme temperature climates, on the one hand, and yet has an improved heat recovery cycle.

SUMMARY OF THE INVENTION

The present invention provides a heat recovery system for heat produced by a heat source, such as a gas turbine system. The heat recovery system uses an organic fluid as the working fluid so that the heat recovery system can be used in extreme temperature climates in which temperatures drop below the freezing point for water. In addition, the present invention provides an increased safety factor by utilizing an intermediate fluid to transfer the heat from the hot exhaust gases to the organic working fluid.

In a preferred embodiment of the present invention, four major systems are interconnected. The first system is a gas turbine system in which the gas turbine is a primary motive force for some particular application, such as driving a gas compressor remotely located geographically and used in a natural gas line. The gas turbine system generates large amounts of heat that usually is lost to the atmosphere by way of the gas exhaust stacks. The second system is a waste heat recovery system that takes turbine exhaust gas and diverts it from the exhaust stacks to extract heat contained therein and thus extract energy from that which was previously wasted. The third system is an intermediate fluid system which in a preferred embodiment is a pressurized water system and to which the waste heat removed from the turbine exhaust gas is transferred. The fourth system is an organic working fluid system to which the heat from the intermediate fluid is transferred to generate an organic fluid vapor that is used to drive an organic fluid turbine for producing power preferably by using an electric generator connected to the organic fluid turbine.

The present invention thus comprises a waste heat recovery system that transfers heat from a primary heat source, such as heat from the exhaust of a gas turbine, to an intermediate fluid, an intermediate fluid system that transfers the heat to an organic working fluid to generate a vapor, and an organic working fluid system whose vapor operates an organic turbine to generate further power from the waste heat.

BRIEF DESCRIPTION OF THE DRAWING

Embodiments of the present invention are described by way of example with reference to the accompanying drawing wherein.

DETAILED DESCRIPTION

Figure 1:
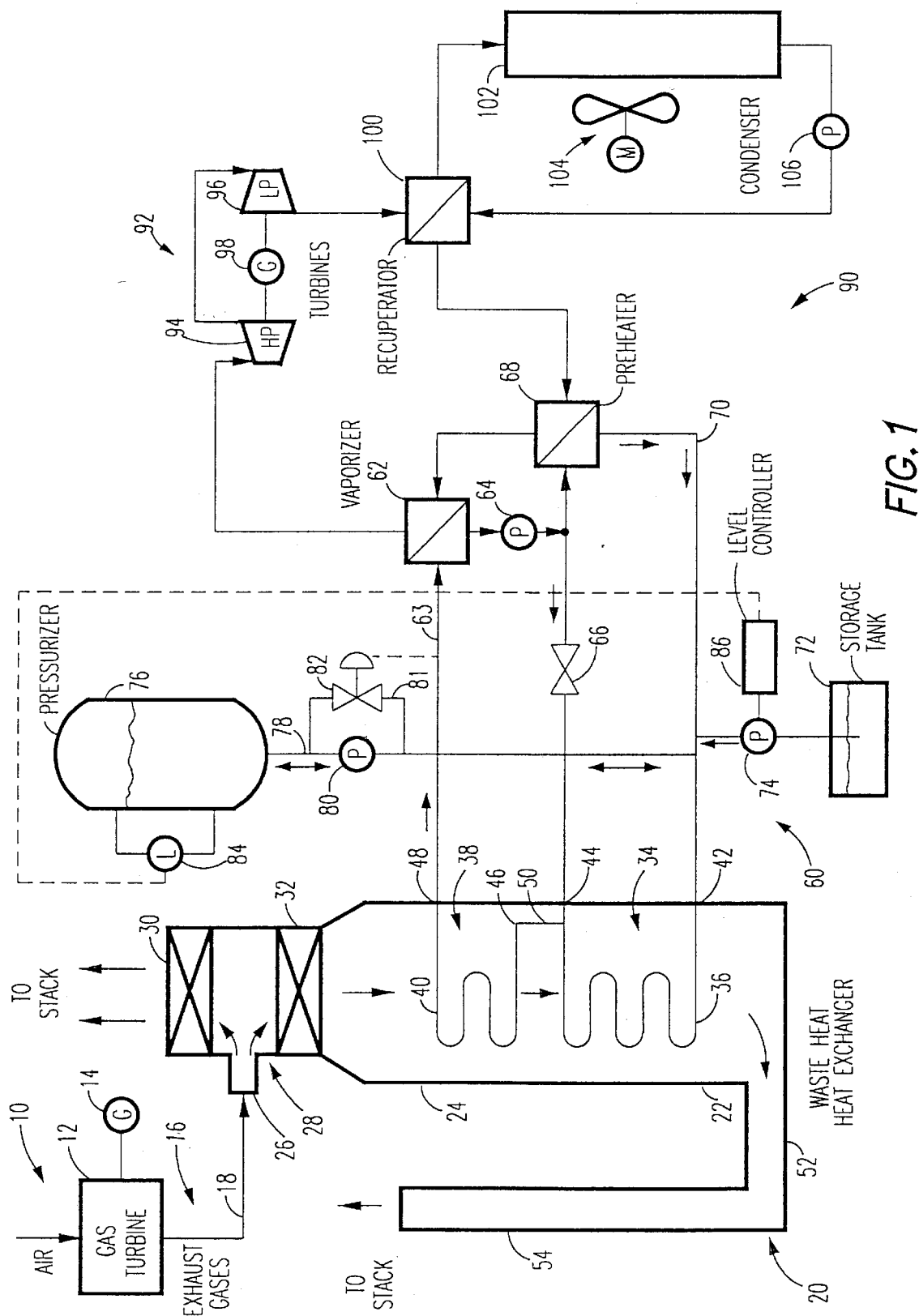
FIG. 1 is a schematic block diagram of a waste heat recovery system having an organic energy converter using an intermediate liquid cycle.

Referring now to FIG. 1, reference numeral 10 designates a gas turbine system in accordance with the present invention. The gas turbine unit drives a power device or mechanical power device such as electric generator 14 for producing electric power or a gas compressor. Exhaust gases, exiting gas turbine 12 are supplied to waste heat recovery system 20.

Waste heat recovery system 20 comprises heating coils 36 and 40 housed in housing 24 of heat exchanger 22 for transferring heat contained in the exhaust gases to intermediate fluid system 60. When heat is transferred to intermediate fluid system 60, gas turbine exhaust gases in line 18 enter waste heat recovery system 20 at inlet 26 and flow to coils 36 and 40 by opening valve 32 and closing valve 30. Thereafter, heat depleted exhaust gases exit heat exchanger 22 via outlet 52 and flow to the atmosphere via stack 56. If preferred, the route of the exhaust gases can be changed in accordance with the specific site. If, for some reason, heat exchanger 22 is to be bypassed, exhaust gases are supplied to the atmosphere by closing valve 32 and opening valve 30 for supplying the exhaust gases to the atmosphere.

Heat transfer fluid, preferably water, flowing in intermediate fluid system 60, which is a closed, pressurized liquid water flow system, receives heat from exhaust gases flowing in heat exchanger 22. The heat transfer fluid flowing in intermediate fluid system 60 exits heat exchanger 22 at 48 and transfers heat to organic fluid present in organic Rankine cycle working fluid system designated by numeral 90 through use of vaporizer 62. Portion of heat depleted heat transfer fluid exiting vaporizer 62 is supplied by pump 64 to heat exchanger 22 at 44 while a further portion of heat depleted heat transfer fluid is supplied to pre-heater 68 for pre-heating the organic working fluid in organic e cycle working fluid system 90. In a preferred configuration, pump 64 is actually two centrifugal pumps connected in parallel with each pump capable of supplying 100% of the pumping requirements, which at steady state full operation is about 130 kilograms per second (kg/s). The ratio of the amount of flow of heat transfer fluid returned to heat exchanger 22 at 44 to the amount of heat transfer fluid supplied to pre-heater 68 is determined by valve 66. Usually the ratio is 70% flowing into heat exchanger 22 at 44 to 30% flowing to pre-heater 68 and preferably 72.5% to 27.5%. Further heat depleted heat transfer fluid exiting pre-heater 68 is supplied to heat exchanger 22 at inlet 42 for receiving more heat from exhaust gases in coil 36. In a preferred embodiment, heat exchanger 22 has a capacity of transferring (i.e. recovering) about 33,000 kilowatts (kW) of energy.

When using water, the pressure of the water or heat transfer fluid flowing in intermediate fluid system 60 is maintained by pressurizer 76. The lower or liquid side of pressurizer 76 is connected to line 70 in intermediate fluid system 60 via line 78 and pump or pumps 80 together with valve 82. Valve 82 senses the pressure of the heat transfer fluid flowing in line 63 for maintaining the desired pressure. Typically, the pressure is maintained at about 3500 kPa with the range of 3000 to 4000 kPa in order to ensure that the water does not boil. Storage tank 72 is also connected to conduit 70 for accumulating excess pressurized heat transfer fluid and from which makeup fluid is supplied when required. Makeup heat transfer fluid is transferred to intermediate fluid system 60 according to the level of liquid in pressurizer 76 determined by level sensor 84. Sensor 84 is also connected to level controller 86 for controlling the operation of pump 74. If required, heat transfer liquid present in intermediate fluid system 60 can be emptied into storage tank 72. Such operation can reduce the risk of the heat transfer fluid from freezing.

Organic Rankine cycle working fluid system 90 comprises vaporizer 62 for producing organic working fluid vapor which is supplied to organic vapor turbine 92. Pentane is the preferred organic working fluid. Organic vapor turbine preferably comprises high pressure turbine module 94 which receives organic working fluid vaporizer produced by vaporizer 62 and low pressure organic vapor turbine module 96 which receives expanded organic working fluid vapor exiting high pressure turbine module 96. Both high pressure turbine module 94 and low pressure turbine module 96 produce power and preferably drive electric generator 98 which can be interposed between these turbine modules. Further expanded organic vapor exiting low pressure turbine module 96 is supplied to condenser 102 via recuperator 100 where liquid organic working fluid exiting condenser 102 cool the further expanded organic vapor. Each turbine 92 and 94 can be a 3.75 Mw turbine rotating at 1800 RPM.

Heated liquid organic working fluid exiting recuperator 100 is preferably supplied to pre-heater 68 for receiving heat transferred from heat transfer fluid flowing in intermediate fluid system 60. Further heated liquid organic working fluid exiting pre-heater 68 is supplied to vaporizer 62 thus completing the organic working fluid cycle.

In the above described waste heat recovery system, sufficient heat is removed from the gas turbine exhaust gases to lower the temperature of the gas from a temperature of about 463° C. to about 92° C. This removed waste heat results in the generation by generator 98 of a net electric power of about 5.8 MW and a gross power of about 6.5 MW, the difference in power between the two power figures being needed to operate the components of the system.

In the above describe embodiment, the heat recovery cycle is used to produce electricity. However the shaft power produced by the organic gas turbines 94 and 96 can alternatively be used for directly driving equipment, such as gas compressors or running such machinery without converting the shaft power into electricity.

Furthermore, while the above description specifies a gas turbine, other heat sources can also be used such as industrial heat, internal combustion engines such as diesel engines, gas reciprocating engines, etc. In addition, while the above description discloses a single organic working fluid heat recovery cycle, the present invention includes the use of cascaded, or parallel, operating units in a heat recovery cycle. If cascaded units are used, the higher pressure turbine or turbines may use water as a working fluid in closed cycles.

Moreover, while the above description discloses a power plant utilizing a simple closed cycle organic Rankine cycle or cycles having an air cooled condenser, air can be added to the exhaust gases of the gas turbine for controlling the temperature of the gases from which heat is extracted in the heat recovery cycle. By using a closed, organic Rankine cycle power plant for the heat recovery rather than a steam turbine, the construction, operation, and maintenance of the overall system is simplified permitting reliable and unattended systems to operate for long periods of time at remote locations.

The advantages and improved results furnished by the method and apparatus of the present invention are apparent from the foregoing description of the preferred embodiment of the invention. Various changes and modifications may be made without departing from the spirit and scope of the invention as described in the appended claims.

We claim:

1. A method of generating power using exhaust gases from a gas turbine unit comprising:

heating an intermediate fluid with said exhaust gases;

vaporizing an organic liquid working fluid with said heated intermediate fluid in a vaporizer to form a vaporized working fluid and a heat depleted intermediate fluid;

expanding said vaporized working fluid in an organic vapor turbine for generating power and producing an expanded vaporized working fluid;

condensing said expanded vaporized working fluid to produce a condensate;

transmitting the condensate back to said vaporizer;

and preheating said condensate with said heat depleted intermediate fluid before said vaporizing step.

2. A method as claimed in claim 1, wherein said intermediate fluid is pressurized water flowing in a closed, pressurized liquid water flow system.

3. A method as claimed in claim 2 and further including controlling the ratio of the amount of said heat depleted intermediate fluid preheating said condensate to the rest of said intermediate fluid.

4. A method as claimed in claim 2 and further including a further preheating step of said condensate by heating said condensate with said expanded vaporized working fluid before said condensate is preheated by said heat depleted intermediate fluid.

5. A method as claimed in claim 2 wherein said organic fluid is pentane.

6. A method of recovering energy from waste heat that is produced by a heat source comprising:
provided a heated intermediate fluid heated by the waste heat;
providing a gaseous working organic fluid vapor that has been vaporized from a liquid by said heated intermediate fluid in a vaporizer in which a heat depleted intermediate fluid is produced;
generating electrical power from said gaseous working organic fluid valpor with an electrical generator driven by an organic vapor turbine that is in turn driven by said gaseous working organic fluid vapor, which produces an expanded working fluid vapor;
producing a condensate in a condenser from said working organic fluid valpor after the use thereof in the organic vapor turbine; and
providing said condensate to said vaporizer;
and producing a preheated condensate before said condensate is provided to said vaporizer with said heat depleted intermediate fluid after the intermediate fluid has vaporized the organic fluid.

7. A method of recovering energy from waste heat as claimed in claim 6 wherein said condensate is preheated with said expanded vaporized working fluid.

8. A method for recovering energy from waste heat as claimed in claim 6 wherein said working fluid is pentane.

9. A method of recovering energy from waste heat as claimed in claim 6 wherein said intermediate fluid is pressurized water flowing in a closed, pressurized liquid water flow system.

10. A method for recovering energy from waste heat as claimed in claim 6, and further including producing a preheated condensate with said expanded working fluid vapor before said condensate is preheated by said heat depleted intermediate fluid.

11. A method according to claim 9 further including controlling the ratio of the amount of said heat depleted intermediate fluid preheating said condensate to the rest of said intermediate fluid.

12. A method according to claim 9 including pressurizing said pressurized water flowing in a closed, pressurized liquid water flow system to a pressure so that said water will not freeze at temperatures in cold climates on earth.

13. A method according to claim 9 including providing a pre-heater in which said condensate is heated with heat depleted intermediate fluid before entering said vaporizer.

14. A method according to claim 6 including pressurizing said intermediate fluid.

15. A method according to claim 12 including storing pressurized intermediate fluid and pumping said intermediate fluid from a storage tank into the cycle of said intermediate fluid.

16. A method for recovering energy from waste heat as claimed in claim 6 wherein said intermediate fluid is pressurized water.

17. A heat recovery system that uses the heat produced by a power generating source, the heat recovery system comprising:
a supply of heat from a power generating source;
a heat recovery heat exchanger which receives said supply of heat and in which an intermediate fluid is heated by the supply of heat;
an intermediate fluid system containing an intermediate fluid and including
an intermediate fluid pump having an input and a discharge and lines connected to said pump input and discharge and to said heat exchanger, said lines containing and delivering said intermediate fluid;
a vaporizer in which a vaporized organic working fluid is produced from a liquid organic working fluid with heat contained in said intermediate fluid, said lines connecting said heat recovery heat exchanger to said vaporizer and heat depleted intermediate fluid being discharged from said vaporizer.
an organic vapor turbine that is driven by the vaporized organic working fluid and from which an expanded vaporized organic working fluid exits;
a condenser in which said expanded vaporized organic working fluid condenses into a condensate;
a main condensate pump that is supplied with condensate from said condenser and in turn supplies the condensate to said vaporizer;
and a preheater in which said condensate is heated with heat depleted intermediate fluid before entering said vaporizer.

18. A heat recovery system as claimed in claim 17 wherein said organic working fluid is pentane.

19. A heat recovery system as claimed in claim 18 wherein said intermediate fluid is pressurized water flowing in a closed, pressurized liquid water flow system having a pressure so that said water will not freeze in temperatures found in cold climates on earth.

20. A heat recovery system as claimed in claim 17, wherein said heat recovery heat exchange comprises a lower first set of coils having an input and an output, an upper second set of coils having an input and an output, and a cross-connect line connecting said first set of coils output to said input of said second set of coils; and
wherein said output of said intermediate fluid pump is connected to said cross-connect conduit; and
wherein said intermediate fluid pump discharges through a valve to said cross-connect line.

21. A heat recovery system according to claim 17 wherein said intermediate fluid is pressurized water flowing in a closed, pressurized liquid water flow system.

22. A heat recovery system as claimed in claim 21, wherein said intermediate fluid system further includes a pressurizer connected to a first line located between the discharge of said intermediate fluid pump and said heat exchanger.

23. A heat recovery system as claimed in claim 21 wherein said intermediate fluid system further includes a storage tank having an inlet and an outlet, and a makeup liquid pump connected with lines between said storage tank and said lines connecting said heat recovery heat exchanger to said vaporizer.

24. A heat recovery system as claimed in claim 22 and further including a storage tank having an inlet and an outlet, and a pump connected with lines between said storage tank and said first line located between the discharge of said intermediate fluid pump and said heat exchanger; and wherein said pressurizer includes a level controller connection that is connected to said storage tank.

25. A heat recovery system as claimed in claim 21 wherein said preheater has a primary side containing a heat providing fluid and a secondary side containing a heat receiving fluid, said preheater receiving said heat depleted intermediate fluid from the vaporizer on the primary side, and receiving said condensate via said condensate pump on the secondary side thereof and providing a further heat depleted intermediate fluid to said heat recovery heat exchanger.

26. The heat recovery system according to claim 17 further including a recuperator for preheating condensate with said expanded vaporized organic working fluid before said condensate is supplied to said preheater for preheating the condensate with heat depleted intermediate fluid.

27. The heat recovery system according to claim 21 wherein said organic vapor turbine further comprises a high pressure turbine module and a low pressure turbine module.

28. The heat recovery system according claim 26 further including an electric generator.

29. The heat recovery system according to claim 28 wherein the electric generator is driven by both the high pressure turbine module and the low pressure turbine module.

30. The heat recovery system according to claim 29 wherein the electric generator is interposed between the high pressure turbine module and the low pressure turbine module.

31. A heat recovery system according to claim 17 further including means for controlling the ratio of the amount of said heat depleted intermediate fluid preheating said condensate to the rest of said intermediate fluid.

32. A heat recovery system according to claim 31 wherein said means for controlling the ratio of the amount of said heat depleted intermediate fluid preheating said condensate to the rest of said intermediate fluid comprises a valve.

33. A method according to claim 11 wherein the step of generating electrical power from said gaseous organic fluid vapor with an electrical generator driven by an organic vapor turbine is carried out by expanding said gaseous organic fluid vapor at high pressure and thereafter at low pressure in separate modules.

34. A method according to claim 33 wherein the step of generating electrical power from said gaseous organic fluid vapor with an electrical generator is carried out by constructing and arranging said electrical generator to be driven by the high pressure and the low pressure modules.

35. A method according to claim 34 wherein the step of generating electrical power from said gaseous organic fluid vapor with an electrical generator is carried out by constructing and arranging said electrical generator to be interposed and driven by the high pressure and the low pressure modules.

* * * * *